(12) United States Patent
Maas et al.

(10) Patent No.: US 6,773,787 B2
(45) Date of Patent: Aug. 10, 2004

(54) LIGHT DIFFUSING ARTICLES AND METHODS TO MANUFACTURE THEREOF

(75) Inventors: Christianus J. J. Maas, Rilland (NL); Hendrik Verhoogt, Bergen Op Zoom (NL); John Van Der Poel, Ossendrecht (NL); Johannes Martinus Dina Goossens, Bergen Op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/137,135

(22) Filed: May 1, 2002

(65) Prior Publication Data

US 2003/0207082 A1 Nov. 6, 2003

(51) Int. Cl.$^7$ .......................... D06N 7/04; C08F 283/02
(52) U.S. Cl. ........................................ 428/141; 525/464
(58) Field of Search ........................... 428/141; 525/464

(56) References Cited

U.S. PATENT DOCUMENTS

| | | |
|---|---|---|
| 5,372,879 A | 12/1994 | Handa et al. |
| 5,773,134 A | 6/1998 | Inokuchi et al. ............ 428/220 |
| 6,284,824 B1 | 9/2001 | Iji et al. ..................... 524/267 |

FOREIGN PATENT DOCUMENTS

| | | | |
|---|---|---|---|
| EP | 0604130 B1 | 10/1997 | |
| JP | 03-207743 | 9/1991 | |
| JP | 2001-66701 | 3/2001 | |
| WO | WO 02/28970 A1 | 4/2002 | ........... C08L/69/00 |

OTHER PUBLICATIONS

Japanese Patent No.: JP2002302599; Publication Date: Oct. 18; 2002; "Polycarbonate–Based Composition"; Abstract Only, 1 page.
European Search Report for EP Patent Application No. 03252775.69–2102; Reference No. 08CS122837/9341; Date: Aug. 26, 2003; 3 pages.

*Primary Examiner*—Harold Pyon
*Assistant Examiner*—Patricia L. Nordmeyer

(57) ABSTRACT

Disclosed herein is a light diffusing substrate in the form of film or sheet including multi-wall sheet and a process for making such light diffusing article, wherein the article comprises a light transmitting thermoplastic resin and about 0.001 to 10 wt. parts of a polyalkyl silsesquioxane, wherein the alkyl group is selected from a methyl, a C12–C18 alkyl, hydride, phenyl, vinyl, and cyclohexyl. The light diffusing substrate is characterized as having a surface roughness expressed as a centerline average height Ra of about or less than 0.1 $\mu$m, a ten-point surface roughness Rz of about or less than 1.0 $\mu$m, and a maximum height surface roughness Rmax of about or less than 1.0 $\mu$m.

21 Claims, No Drawings

LIGHT DIFFUSING ARTICLES AND METHODS TO MANUFACTURE THEREOF

FIELD OF THE INVENTION

This invention relates generally to a light diffusing article in the form of film or multi-wall sheet and manufacturing process thereof.

BACKGROUND OF THE INVENTION

It is known in the prior art to improve the light diffusion properties of thermoplastic substrates such as polyester or polycarbonate substrate by the addition of incompatible inorganic minerals, e.g., $BaSO_4$, a commonly used white pigment. Besides $BaSO_4$, other minerals that may be used are aluminum oxide, zinc oxide (ZnO), calcium sulfate, barium sulfate, calcium carbonate (e.g., chalk), magnesium carbonate, sodium silicate, aluminum silicate, silicon dioxide ($SiO_2$, i.e., silica), mica, clay, talc, and the like in a range of up to about 25 weight percent. Thicker substrates require less inorganic minerals to attain the same diffusion properties. The action of these minerals is to cause formation of cavities or voids in the substrate. These cavities contribute to making the substrate more opaque due to multiple light scattering. The concentration of the minerals and their particle sizes determine the void structure and several substrate properties, i.e., the higher the concentration of the minerals, the lower the molecular weight of the resulting thermoplastic resins, resulting in impaired impact strength and other physical and mechanical properties.

EP 0 604 130 B1 discloses polycarbonate compositions comprising about 0.001 to 10 wt. parts poly(methyl silsesquioxanes) having good light dispersion properties despite the high rate of light transmission. The composition can be advantageous in applications requiring high light transmission and high integrity for safety, such as sky lights, walls, and other large-scale lighting covers such as signs.

JP 03 207743 discloses articles such as lightening units, illuminated signs and displays having high light transmittance, which compositions comprise methacrylate resin and about 0.1 to 10 wt. % of poly(methyl silsesquioxanes) with a particle size of about 0.5 to 20 microns.

JP unexamined patent publication no. 2001-66701 discloses light-transmitting thermoplastic composition comprising scattered particles of about 1 to 8 µm. in materials such as polycarbonate and methacrylate resins, for applications such as lighting fixtures, sign boards, glazing and screens for projection television. In one embodiment, the scattered particles are coated with a polyorgano silsesquioxane. In another embodiment, the composition is used in a light transmission screen for use in liquid crystal display (LCD) applications.

U.S. Pat. No. 5,372,879 discloses the use of silicone resins, e.g., Tospearl 120, in a polyester composition such as polyethylene terephthalate for magnetic recording base, for a film with a surface having a small number of large protuberances, excellent running property and excellent winding property. In one embodiment, the surface roughness of the polyester film is 0.022 µm as measured using JIS B0601.

The specifications applied to plastic sheets or films ("substrates) in a number of multi-wall sheet applications and optical applications in general, are rather stringent, including the requirements that the substrates should not form any bubbles or cavities when thermoplastically processed; they should display minimal optical birefringence; they should have a low thickness tolerance or variation, low curvature, low thermal shrinkage, and low surface roughness. Backlit flat panel displays (LCD) utilize a cold cathode florescent lamp as a light source. This cylindrical source is directionally reflected towards an injection molded wedge more commonly referred to as a light guide. The light guide is utilized to help provide an evenly distributed source of light from the backlight to the viewer. The light that results from the light guide requires further distribution to provide the uniform intensity that is required. This is commonly accomplished with a film with light diffusion type functionality to provide light spreading and decorelation type functions.

Applicants have surprisingly found that the surface quality of light diffusing articles in the form of multi-wall sheets and films ("substrate") can be significantly improved by the addition to a light transmitting resin composition comprising the substrate such as polycarbonate, a sufficient amount of a polyalkyl silsesquioxane or a mixture thereof, whereby the alkyl groups can be methyl, C2–C18 alkyl, hydride, phenyl, vinyl, or cyclohexyl.

BRIEF SUMMARY OF THE INVENTION

The invention relates to methods to improve surface quality of a light diffusing article by adding to the thermoplastic composition comprising the article a sufficient amount of a sufficient amount of a polyalkyl silsesquioxane or a mixture thereof, whereby the alkyl groups can be methyl, C2–C18 alkyl, hydride, phenyl, vinyl, or cyclohexyl.

The invention further relates to a light diffusing article comprising 0.001 to 10 wt. parts per 100 wt. part of a light transmitting plastic resin, of a polyalkyl silsesquioxane or a mixture thereof, whereby the alkyl groups can be methyl, C2–C18 alkyl, hydride, phenyl, vinyl, or cyclohexyl.

In one embodiment of the invention, the light diffusion article is characterized by having a surface roughness of: a) a center line average roughness Ra of 0.1 µm or less, b) a ten-point average roughness Rz of 0.5 µm or less, and c) a maximum height surface roughness of 1 µm or less.

DETAILED DESCRIPTION OF THE INVENTION

Thermoplastic Component The thermoplastic resin constituting the light diffusing article of the present invention is a light transmitting material such as polycarbonate.

The polycarbonate resin for use is generally obtained from a dihydric phenol and a carbonate precursor by an interfacial polycondensation method or a melt polymerization method. Typical examples of the dihydric phenol used in this case include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (generally called "bisphenol A"), 2,2-bis((4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)

pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl) phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenyl sulfoxide, 4,4'-dihydroxydiphenyl sulfide, 4,4'-dihydroxydiphenyl ketone, 4,4'-dihdyroxydiphenyl ether and 4,4'-dihydroxydiphenyl ester. Of these, 2,2-bis(4-hydroxyphenyl)alkanes are preferred, and bisphenol A is particularly preferred. The above dihydric phenols may be used alone or in combination.

The carbonate precursor is selected from carbonyl halides, carbonate esters or haloformates, and specific examples thereof include phosgene, diphenyl carbonate and dihaloformate of a dihydric phenol.

When the above dihydric phenol and the carbonate precursor are allowed to react by an interfacial polycondensation method or a melt polymerization method to produce a polycarbonate resin, a catalyst, a terminal stopper and an antioxidant for the dihydric phenol may be used as required. Further, the polycarbonate resin may be a branched polycarbonate resin formed by copolymerization of trifunctional or higher polyfunctional aromatic compounds or may be a polyester carbonate resin formed by copolymerization of aromatic or aliphatic difunctional carboxylic acids, and it may be also a mixture of two or more of obtained polycarbonate resins.

The reaction by an interfacial polycondensation method is generally a reaction between a dihydric phenol and phosgene, and the reaction is carried out in the presence of an acid binder and an organic solvent. The acid binder is selected, for example, from alkali metal hydroxides such as sodium hydroxide and potassium hydroxide or amine compounds such as pyridine. The organic solvent is selected, for example, from halogenated hydrocarbons such as methylene chloride and chlorobenzene. For promoting the reaction, there may be used a catalyst that is selected, for example, from tertiary amines such as triethylamine, tetra-n-butylammonium bromide and tetra-n-butylphosphonium bromide, quaternary ammonium compounds or quaternary phosphonium compounds. In this case, preferably, the reaction temperature is generally 0 to 40° C., the reaction time period is approximately 10 minutes to 5 hours, and the pH during the reaction is maintained at 9 or more.

In the above interfacial polymerization method, generally, a terminal stopper is used. The terminal stopper is selected from monofunctional phenols. Monofunctional phenols are generally used as a terminal stopper for adjusting molecular weights, and an obtained polycarbonate resin has terminals blocked with groups from the monofunctional phenols, so that the polycarbonate resin has excellent thermal stability over any other resin. Examples of the above monofunctional phenols include phenol, p-tert-butylphenol, p-cumylphenol and isooctylphenol. Of these, p-tert-butylphenol is preferred.

The reaction by a melt polymerization method is generally an ester exchange reaction between a dihydric phenol and a carbonate ester, and the reaction is carried out by a method in which a dihydric phenol and a carbonate ester are mixed under heat in the presence of an inert gas and an alcohol or a phenol being formed is distilled off. Although differing depending upon the boiling point of the formed alcohol or phenol or the like, the reaction temperature is generally in the range of from 120° C. to 350° C. At a later stage of the reaction, the pressure in the reaction system is reduced approximately to 1,300 Pa to 13 Pa (10 to 0.1 Torr) to easily distill the formed alcohol or phenol off. The reaction time period is generally approximately 1 to 4 hours. The obtained polycarbonate resin preferably has a specific viscosity in the range of 0.25 to 0.6, preferably 0.3 to 0. 55 when 0.7 g of the polymer thereof is dissolved in 100 ml of methylene chloride and measured for a specific viscosity at 20° C.

Silicon Ladder Resin Component. Applicants have found that the addition of a silicon ladder resin, i.e., a organopolysiloxane having a ladder-like molecular structure, or sometimes referred to as a polyorgano silsesquioxane having a cage-like or double-ring structure, surprisingly improves the surface quality of the light diffusing article of the present invention while provides optimal shading effects as well as balanced physical properties, flame retardancy and outdoor weathering performance properties of the light diffusing article. The addition of the silicon ladder resin further facilitates the manufacturing of the article of the present invention in terms of less plating and fouling of the production machine.

Polyorgano silsesquioxanes can be prepared by conventional methods, such as those disclosed in F. Brown et al., J. Polymer Sci., Part C, No. 1, p. 83 (1983), in such a way that one or more of the trialkoxysilanes are hydrolyzed with an acid catalyst and condensed. Suitable examples of polyorgano silsesquioxane include polyalkyl silsesquioxanes, whereby the alkyl groups can be methyl, C2–C18 alkyl, hydride, phenyl, vinyl, cyclohexyl or any combination of these.

In one embodiment of the invention, the polyorgano silsesquioxane is a polyalkyl silsesquioxane, wherein the alkyl group can be a methyl, a C2–C18 alkyl, hydride, phenyl, vinyl, cyclohexyl or a combination thereof. Examples include polymethyl silsesquioxane, polyphenyl silsesquioxane, polyphenyl-methyl silsesquioxane, a phenyl silsesquioxane-dimethyl siloxane copolymer in liquid form, polyphenyl-vinyl silsesquioxane, polycyclohexyl silsesquioxane, polycyclopentyl silsesquioxane, and polyhydride silsesquioxane.

In one embodiment of the invention, the polyorgano silsesquioxane is a polyalkyl siloxane powder material prepared by one of the followings: hydrolysis, polymerization or crosslinking of alkylsilanes or alkylsiloxanes in such a way as to give a defined particulate structure with a surface consisting largely of alkylfunctional silicone atoms.

In yet another embodiment, the silicon ladder resin is a poly(methyl silsesquioxane) obtained by hydrolytic condensation in aqueous ammonia or amines of methyltrialkoxysilanes, or their hydroxylates or condensates. The resin is spherical in shape and form free-flowing powders, which are low in impurities such as chlorine, alkali metals, or alkaline earth metals.

The polyorgano silsesquioxane is used in a sufficient amount to provide the surface quality desired of the light diffusing article. In one embodiment, the amount is about 0.001 to 10 wt. parts of polyorgano silsesquioxane per 100 parts of light transmitting thermoplastic resin. In a second embodiment, the amount is about 0.10 to about 5 wt. %. In another embodiment, the amount is about 0.20 to about 2 wt. % of the total thermoplastic composition. In yet another embodiment, the amount is about 0.2 to about 1 wt. % of the total composition.

In one embodiment of the embodiment, the polyorgano silsesquioxane has an average particle size of about or less than 4 µm. In a second embodiment, the polyorgano silsesquioxane has an average particle size of about 2 µm or less. In a third embodiment, the polyorgano silsesquioxane is a polymethyl silsesquioxane powder from Toshiba Silicones, under the trade name Tospearl with a mean particle size of equal or less than about 4.0 µm. In a fourth embodiment, the polyorgano silsesquioxane is available from Toshiba Silicones under the trade name Tospearl 120 with a mean particle size of equal or less than about 2.0 µm.

Other components. The thermoplastic composition for use in the light diffusing substrates of the present invention may contain, as further components, any additive conventionally used, such as fillers, other compatible plastics, anti-static agents, antioxidants, flame-proofing agents, lubricants, UV absorbers/stabilizers. The additives may be used in conventional effective amounts. In one embodiment, they are present in an amount from 0.1 to a total of about 20% relative to the total weight of the composition. The use of such additives may be desirable in enhancing the processing of the composition as well as improving the products or articles formed therefrom. Examples of such include: oxidative and thermal stabilizers, lubricants, mold release agents, flame-retarding agents, oxidation inhibitors, dyes, pigments and other coloring agents, ultraviolet light stabilizers, nucleators, plasticizers, as well as other conventional additives known to the art. These conventional additives may be incorporated into compositions at any suitable stage of the production process, and typically are introduced in the mixing step and included in an extrudate.

By way of example, representative ultraviolet light stabilizers include various substituted resorcinols, salicylates, benzotriazole, benzophenones, and the like. Suitable exemplary lubricants and mold release agents include stearic acid, stearyl alcohol, stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

In one embodiment of the invention with the plastic forming the transparent plastic substrate being an aromatic polycarbonate resin, the ultraviolet absorbent is selected from 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-(2'-hydroxy-5'-t-octylphenyl) benzotriazole or 2-(4,6-diphenyl-1,3,5-triazin-2-yl)-5-hexyloxyphenol.

In one embodiment of the invention wherein the light diffusing substrate is a multi-wall sheet, the substrate is further coated with a protection layer such as UV coating or infrared light reflecting coating. In one embodiment, the coating comprises IR reflecting particles which comprise a titanium dioxide layer applied on a flake like carrier. In another embodiment, the UV coating layer comprises a non-fluorescing material selected from the group consisting of benzotriazoles, triazines and diphenylcyanoacrylates, or a fluorescing material such as a benzoxazinone.

In one embodiment wherein a UV coating layer is employed, the thickness of the coating is governed by the concentration of UV absorbing compound. For a UV protective layer that will absorb at least 90% of the harmful UV radiation prior to it reaching the underlying light diffusing sheet with the UV protective layer applied by coextrusion, lamination, or coating technology. In one embodiment of a multi-wall sheet, the UV coating layer has a thickness of about 2 to 10 microns.

Manufacturing of the light diffusing article. The mixing of the components for the preparation of the composition used in the light diffusing substrate of the present invention may be carried out conventionally by methods and using equipment which are well known in the art.

In one embodiment, the components are prepared by mixing light-diffusing polycarbonate resins with poly (methyl silsesquioxanes), and then melt-kneading the mixture in a suitable extruder to form pellets. The pellets are then used to form the light diffusing substrates of the present invention through conventional methods such as extrusion, injection molding, or solvent casting into light diffusing substrates for commerce.

In one embodiment of the invention, the solvent casting method is used for forming a light diffusing film of low retardation.

In another embodiment of the invention, wherein the light diffusing substrate is formed using an extrusion process, it is surprisingly found that the extruder die and calibrators have to be cleaned less frequently (in some instances, about ⅕ as often) due to less plating out and fouling problems seen in the manufacturing process of the prior art, wherein BaSO4 and other materials are used to make light diffusing articles. In yet another embodiment of the invention, the extruder is in operation for a minimum of 10 hrs. before the extruder die has to be cleaned.

In embodiments wherein the substrate is further coating with a protective coating layer, the coating can be applied via roller coating, spray coating or screen-printing.

In embodiments of the invention wherein the light diffusing substrate is a multi-wall sheet, the sheet has a thickness of about 5 to 50 mm with a thickness variation of ±10% over an area of 1 $m^2$. In another embodiment of a multi-wall sheet, the thickness is about 10 to 30 mm. In embodiments wherein the light diffusing substrate is in the form of a film, the film thickness is about 2 to 15 mils, with a thickness variation of ±10% over an area of 1 $m^2$.

The light diffusing substrate of the present invention is characterized as having excellent surface roughness. In one embodiment of the invention, the center line average roughness Ra is characterized as being 0.1 µm or less, a ten-point average roughness Rz of 1 µm or less, and a maximum height surface roughness Rmax of 1 µm or less. In another embodiment, the surface roughness is characterized as having a ten-point average roughness Rz of 0.5 µm or less, and a maximum height surface roughness of Rmax of 0.5 µm or less. In yet another embodiment, the surface roughness is characterized as having a ten-point average roughness Rz of 0.3 µm or less.

The light diffusing substrate of the invention is further characterized as having minimum variations in light transmission due to the excellent dispersion property of the polyalkyl silsesquioxane. In one embodiment, the variation in light transmission is within 5% over a web area of 1 m² of multi-wall sheet. In another embodiment, wherein the light diffusing substrate is in the form of a film having a thickness of 2–15 mils, the light transmission variation is ±2%.

The light diffusing substrate of the present invention is used in a number of multi-wall sheet applications and optical applications in general, and in particular, in the form of a film for use as a diffusing film for flat panel display applications.

EXAMPLES

The present invention is illustrated by the examples and measurement methods that follow.

Surface finish Surface finish of a substrate is usually measured with a profilometer, which comprises a probe having a diamond tipped stylus. Examples of such profilometers include Surtronic, Surfcom, and Perthometer.

In the present invention, surface finish is represented as Ra, Rz, and Rmax, recorded in micrometers, and measured according to DIN 4768 using a Perthometer M4P from Mahr. The Ra of a surface is the measurement of the arithmetic average of the scratch depth. It is the average of 5 individual roughness depths of five successive measuring lengths, where an individual roughness depth is the vertical distance between the highest point and a center line. Rz is the average of 5 individual roughness depths of a measuring length, where an individual roughness depth is the vertical distance between the highest point and the lowest point. Rmax is the maximum roughness depth from the highest point and the lowest point in the measuring length.

Haze and light transmission: The haze, expressed as a percentage, is obtained by subtracting the dispersed light intensity from the incident light intensity, measured using a haze meter (for instance, NDH-300A manufactured by NIPPON DENSHOKKU KOGYO Co., Ltd.). The light transmission, expressed as a percentage, is obtained by subtracting the total light transmission from the incident beam intensity, measured using an integrating spherical light transmittance meter.

As the term "light" is used herein, it is intended to include any form of electromagnetic radiation, but especially that in the spectrum of visible light (400 to 700 nm wavelength), up through infrared (IR) light radiation (700 to greater than 2500 nm wavelength), and down through the ultraviolet (UV) light spectrum (400 to 250 nm and below).

Gloss 60° Gloss was obtained as follows by measuring a reflected light flux after irradiating a light beam onto the substrate at an entry angle of 60 degrees and receiving the light beam at the same 60 degrees using an automatic calorimetric color-difference as per ASTM D523.

Diffusivity In a substantial but demanding light display market is the one for portable or laptop computer displays, which requires high levels of diffusivity from very thin materials. Diffusivity is evaluated as whether the substrate provides efficient diffusing of an illuminating light source, such that the lighting elements of the light source are not apparent to the viewer. Diffusivity is evaluated as G (GOOD, with little or no light source being apparent to the viewer) or P (POOR, with light source becoming apparent to the viewer).

In examples 1–3, multiwall sheet (MWS) were produced from compositions comprising polycarbonate resin (available from GE Plastics as PC 105) and 0.44 wt. % $CH_3SiO_{1.5}$ poly(methyl silsesquioxane), available from Toshiba Silicone under the trades name Tospearl 120, with an average particle size of 2microns. In comparable examples 4–6, the Tospearl was replaced with BaSO4. The MWS was produced from a 150 mm single screw extruder in the form of twin layer structure with vertical channels having 10 mm thickness. The results are presented as in Table 1 that follows:

| Example | Additive | Ra μm | Rz μm | Rmax μm | Transmission | Diffusivity |
|---|---|---|---|---|---|---|
| 1 | Poly Methyl silsesquioxane | 0.03 | 0.34 | 0.59 | 48 | G |
| 2 | Poly Methyl silsesquioxane | 0.03 | 0.28 | 0.49 | 48 | G |
| 3 | Poly Methyl silsesquioxane | 0.02 | 0.21 | 0.24 | 48 | G |
| Comp. 4 | BaSO₄ | 0.40 | 2.48 | 4.48 | 48 | G |
| Comp. 5 | BaSO₄ | 0.41 | 2.88 | 4.84 | 48 | G |
| Comp. 5 | BaSO₄ | 0.43 | 3.44 | 5.24 | 48 | G |

In examples 7–13, molded plaques of approximately 5 cm by 2 cm, and of thickness of either 2.4 mm or 3.2 mm, were produced from a 40 mm single-screw molding machine model Engle 110. Tospearl 120 refers to $CH_3SiO_{1.5}$ poly (methyl silsesquioxane) from Toshiba Silicone having an average particle size of 2microns. Tospearl 145 refers poly (methyl silsesquioxane) having an average particle size of 4.5 microns. The results are as follows in Table 2:

| | | Comp. 7 | Comp. 8 | Ex. 9 | Comp. 10 | Ex. 11 | Ex. 12 |
|---|---|---|---|---|---|---|---|
| Polycarbonate | PC105 | 93.3 | 0 | 99.41 | 0 | 99.41 | 0 |
| PMMA | | 0 | 93.3 | 0 | 99.41 | 0 | 99.41 |
| Irgaphos 168 | | 0.1 | 0.1 | 0.1 | 0.1 | 0.1 | 0.1 |
| Tospearl 120 | | 0 | 0 | 0.4928 | 0.4928 | 0 | 0 |
| Tospearl 145 | | 0 | 0 | 0 | 0 | 0.4928 | 0.4928 |
| BaSO4 | | 6.6 | 6.6 | 0 | 0 | 0 | 0 |
| Transmission | 3.2 mm | 73.4 | 36.7 | 46.9 | 71.8 | 54.9 | 79.2 |
| | 2.5 mm | 77.4 | 44.4 | 53.3 | 77.3 | 62.3 | 83.6 |
| Gloss (60°) | 3.2 mm | 69.8 | 60.2 | 92.4 | 87.8 | 89.5 | 88.5 |
| | 2.5 mm | 67.2 | 72 | 90.2 | 84.2 | 89.2 | 83.4 |
| Diffusivity | | Good | Good | Good | Poor | Poor | Poor |
| Roughness | Ra | 0.2 | 0.07 | 0.05 | 0.06 | 0.1 | 0.05 |
| | Rz | 2.2 | 0.45 | 0.3 | 0.35 | 0.8 | 0.5 |
| | Rmax | 3.6 | 0.62 | 0.5 | 0.6 | 1.5 | 0.7 |

In the third set of experiments, Examples 13–14, polycarbonate film (PC 105) having a thickness of 230 microns was produced from Breyer extruder L/D of 33, with the results as follows:

|  | Ra | Rz | Rmax |
|---|---|---|---|
| Example 13 - 0.35% Tospearl 120 | 0.01 | 0.13 | 0.18 |
| Comp. 14 - 5% BaSO4 | 0.03 | 0.56 | 0.92 |

As shown above, the use of polyalkyl silsesquioxane gives optical quality substrate with light diffusing properties and light transmission properties surpassing those obtained in the Comparison examples.

While the invention has been described in terms of various specific embodiments, those skilled in the art will recognize that the invention can be practiced with modifications within the spirit and scope of the claims.

What is claimed is:

1. A light diffusing substrate comprising:
   a) an aromatic polycarbonate resin,
   b) about 0.001 to 10 wt. parts of a polyalkyl silsesquioxane, wherein the alkyl group is selected from a methyl, a C12–C18 alkyl, hydride, phenyl, vinyl, and cyclohexyl, or a combination thereof;
   wherein said light diffusing substrate is characterized as having a surface roughness expressed as a centerline average height Ra of about or less than 0.1 μm, a ten-point surface roughness Rz of about or less than 1.0 μm, and a maximum height surface roughness Rmax of about or less than 1.0 μm.

2. The light diffusing substrate of claim 1, wherein said polyalkyl silsesquioxane has an average particle size of about or less than 4 μm.

3. The light diffusing substrate of claim 1, wherein said polyalkyl silsesquioxane has an average particle size of about or less than 2 μm.

4. The light diffusing substrate of claim 1, wherein said polyalkyl silsesquioxane is a poly(methyl silsesquioxane).

5. The light diffusing substrate of claim 1, further characterized as having a surface roughness expressed as a centerline average height Ra of about or less than 0.1 μm, a ten-point surface roughness Rz of about or less than 0.5 μm, and a maximum height surface roughness Rmax of about or less than 0.5 μm.

6. The light diffusing substrate of claim 1, in a form selected from a film having a thickness of about 2 to 15 mils, and a multi-wall sheet having a thickness of about 5 to 50 mm.

7. The light diffusing substrate of claim 1, further characterized as having a thickness unevenness of within ±10% over an area of 1 m².

8. The light diffusing substrate of claim 1, further characterized as having a light transmission variation of ±5% over an area of 1 m².

9. The light diffusing substrate of claim 1, characterized as in a form of a multi-wall sheet coated by a UV protective layer having a thickness of about 3 to 10 μm.

10. A process for enhancing the surface smoothness of a light diffusing substrate, said process comprising:
    a) forming a blend comprising an aromatic polycarbonate resin, and about 0.001 to 10 wt. parts of a polyalkyl silsesquioxane, wherein the alkyl group is selected from a methyl, a C2–C18 alkyl, hydride, phenyl, vinyl, and cyclohexyl; or combination thereof
    b) forming via one of extrusion, injection molding, or solvent casting into a light diffusing substrate having a surface roughness expressed as a centerline average height Ra of about or less than 0.1 μm, a ten-point surface roughness Rz of about or less than 1.0 μm, and a maximum height surface roughness Rmax of about or less than 1.0 μm.

11. The method of claim 10, wherein said polyalkyl silsesquioxane has an average particle size of about or less than 4 μm.

12. The method of claim 11, wherein said polyalkyl silsesquioxane has an average particle size of about or less than 2 μm.

13. The method of claim 10, wherein said polyalkyl silsesquioxane is a poly(methyl silsesquioxane).

14. The method of claim 10, wherein said light diffusing substrate formed by one of extrusion, injection molding, or solvent casting is in a form of a film having a thickness of about 2 to 15 mils, or a multi-wall sheet having a thickness of about 5 to 50 mm.

15. The method of claim 10, wherein said light diffusing substrate formed by one of extrusion, injection molding, or solvent casting has a thickness unevenness of within ±10% over an area of 1 m².

16. The method of claim 10, further comprising applying a protective coating layer having a thickness of about 3 to 10 μm on said formed light diffusing substrate.

17. The article of the composition of claim 1, in the form of a light diffusing film.

18. The film of claim 17, for use in flat panel display applications.

19. The article of the composition of claim 1, in the form of a multi-wall sheet.

20. The light diffusing substrate of claim 1, wherein the alkyl group is C2–C18 alkyl, hydride, phenyl, vinyl, cyclohexyl, or a combination thereof including combinations wherein the alkyl group is methyl.

21. The light diffusing substrate of claim 1, wherein the polyalkyl silsesquioxane is polyphenyl silsesquioxane, polyphenyl-methyl silsesquioxane, phenyl silsesquioxane-dimethyl siloxane copolymer, polyphenyl-vinyl silsesquioxane, polycyclohexyl silsesquioxane, polycyclopentyl silsesquioxane, and polyhydride silsesquioxane.

* * * * *